(12) United States Patent
Gu et al.

(10) Patent No.: US 10,921,339 B2
(45) Date of Patent: Feb. 16, 2021

(54) METHOD TO CHECK THE CONSUMMATION OF SAMPLING BY CONCAVE LIQUID LEVEL

(71) Applicant: Shimadzu Corporation, Kyoto (JP)

(72) Inventors: Ting Gu, Kyoto (CN); Hongyi Huang, Shanghai (CN); Chao Xu, Shanghai (CN)

(73) Assignee: Shimadzu Corporation, Kyoto (JP)

( * ) Notice: Subject to any disclaimer, the term of this patent is extended or adjusted under 35 U.S.C. 154(b) by 140 days.

(21) Appl. No.: 16/397,450

(22) Filed: Apr. 29, 2019

(65) Prior Publication Data
US 2019/0331707 A1 Oct. 31, 2019

(30) Foreign Application Priority Data
Apr. 27, 2018 (CN) .......................... 201810392576.5

(51) Int. Cl.
 *G01N 35/10* (2006.01)
 *G01F 23/292* (2006.01)
 *G01N 1/00* (2006.01)

(52) U.S. Cl.
 CPC ....... *G01N 35/1009* (2013.01); *G01F 23/292* (2013.01); *G01N 2001/002* (2013.01); *G01N 2035/1025* (2013.01)

(58) Field of Classification Search
 CPC ...... G01F 23/38; G01F 23/266; G01F 23/268; G01F 23/263; G01F 23/265; G01F 23/26;
 (Continued)

(56) References Cited

U.S. PATENT DOCUMENTS 4,767,982 A * 8/1988 Florig .................... G01R 27/22
 324/640
4,818,492 A * 4/1989 Shimizu ................ G01F 23/263
 422/509

(Continued)

FOREIGN PATENT DOCUMENTS

CN 110320166 A 10/2019

OTHER PUBLICATIONS

First Chinese Office Action dated Jul. 31, 2020 for the corresponding Chinese Patent Application No. 201810392576.5, with its machine translation.

*Primary Examiner* — Andre J Allen
(74) *Attorney, Agent, or Firm* — Muir Patent Law, PLLC

(57) ABSTRACT

A detection system may include a reaction cell which is a container for reacting the detection sample, a light source configured to emit a detection light toward an inside of the reaction cell from one side of the reaction cell, and a photoelectric sensor arranged on the other side of the reaction cell so as to face the light source and configured to receive the detection light transmitted through the reaction cell and convert a signal of the received detection light into an electrical signal. A judging method may include judging whether or not the detection sample has been supplied based on whether or not the electrical signal output from the photoelectric sensor changes by sending an instruction to supply the detection sample to the reaction cell to the detection system in a state in which the light source and the photoelectric sensor are kept being operated. When the liquid level of the detection sample reaches an optical path of the detection light and an amount of change of the electrical signal output from the photoelectric sensor exceeds a specified threshold, it may be judged that the detection sample has been supplied. According to embodiments of the present invention, it is possible to easily, (Continued)

assuredly and quickly judge whether or not the detection sample has been supplied by existing devices in a detection system.

5 Claims, 2 Drawing Sheets

(58) Field of Classification Search
CPC .... G01F 23/363; G01F 23/72; G01F 23/0007; G01F 23/284; G01F 23/32; G01F 23/36; G01F 23/0076; G01F 23/24; G01F 25/0061; G01F 23/0061; G01F 23/0069; G01F 23/296; G01F 23/2962; G01F 23/62; G01F 23/18; G01F 23/34; G01F 22/00; G01F 23/02; G01F 23/14; G01F 23/22; G01F 23/243; G01F 23/246; G01F 23/247; G01F 23/248; G01F 23/2845; G01F 23/292; G01F 23/74; G01F 23/76; G01F 23/0046; G01F 23/20; G01F 23/2921; G01F 23/2963; G01F 23/303; G01F 15/003; G01F 1/007; G01F 1/661; G01F 1/6847; G01F 1/69; G01F 23/00; G01F 23/0038; G01F 23/162; G01F 23/185; G01F 23/226; G01F 23/241; G01F 23/242; G01F 23/244; G01F 23/261; G01F 23/2922; G01F 23/2927; G01F 23/2928; G01F 23/2961; G01F 23/366; G01F 23/40; G01F 23/54; G01F 23/543; G01F 23/60; G01F 23/606; G01F 23/64; G01F 23/683; G01N 2035/00326; G01N 35/0092; G01N 2035/00495; G01N 35/00; G01N 35/026; G01N 35/00871; G01N 2015/1006; G01N 35/10; G01N 35/1065; G01N 21/25; G01N 35/1072; G01N 35/54366; G01N 15/1475; G01N 2035/00138; G01N 2035/00356; G01N 2035/00366; G01N 2035/00425; G01N 2035/0449; G01N 2035/0486; G01N 2035/0491; G01N 2201/024; G01N 2201/04; G01N 33/5005; G01N 35/00029; G01N 35/00069; G01N 35/04; G01N 35/1009; G01N 35/1011; G01N 2015/0073; G01N 2015/008; G01N 2015/1486; G01N 2035/00148; G01N 2035/00237; G01N 2035/00306; G01N 2035/00435; G01N 2035/00633; G01N 2035/0474; G01N 2035/0493; G01N 2035/0494; G01N 21/27; G01N 2201/12; G01N 33/54306; G01N 33/54313; G01N 33/56983; G01N 33/62; G01N 33/6827; G01N 33/80; G01N 33/92; G01N 35/00623; G01N 21/6428; G01N 2035/0094; G01N 21/76; G01N 33/50; G01N 2035/00277; G01N 2035/00881; G01N 2035/103; G01N 21/80; G01N 2333/471; G01N 2800/368; G01N 33/689; G01N 33/84; G01N 35/0098; G01N 1/40; G01N 2021/6421; G01N 2021/6434; G01N 2021/6441; G01N 2021/6484; G01N 2021/7786; G01N 21/07; G01N 21/35; G01N 21/75; G01N 21/77; G01N 21/78; G01N 2201/062; G01N 2201/068; G01N 2201/0826; G01N 2201/084; G01N 2400/00; G01N 2800/24; G01N 2800/50; G01N 33/492; G01N 33/542; G01N 33/582; G01N 33/66; G01N 35/02; G01N 35/025; G01N 15/14; G01N 1/4077; G01N 2001/4083; G01N 2021/513; G01N 2021/6417; G01N 2021/825; G01N 2035/00811; G01N 21/21; G01N 21/4133; G01N 21/51; G01N 21/645; G01N 21/65; G01N 30/02; G01N 30/88; G01N 33/5302; G01N 33/564; G01N 33/6854; G01N 35/00732; G01N 1/405; G01N 2030/8827; G01N 2035/00534; G01N 2035/1034; G01N 2035/1048; G01N 21/13; G01N 21/84; G01N 27/72; G01N 2800/042; G01N 33/48; G01N 33/487; G01N 33/53; G01N 33/559; G01N 33/566; G01N 33/569; G01N 33/577; G01N 33/6863; G01N 33/86; G01N 35/00663; G01N 35/0095; G01N 35/1095; G01N 1/2035; G01N 1/2202; G01N 1/2211; G01N 1/28; G01N 2001/002; G01N 2001/1025; G01N 2015/0088; G01N 2021/3133; G01N 2030/0095; G01N 2035/1025; G01N 21/255; G01N 21/274; G01N 21/359; G01N 21/534; G01N 21/553; G01N 21/66; G01N 21/85; G01N 21/8507; G01N 2201/08; G01N 2333/5421; G01N 27/07; G01N 27/42; G01N 27/447; G01N 2800/062; G01N 2800/08; G01N 2800/14; G01N 2800/52; G01N 2800/54; G01N 2800/56; G01N 30/16; G01N 30/24; G01N 30/6091; G01N 30/6095; G01N 33/04; G01N 33/24; G01N 33/287; G01N 33/49; G01N 33/493; G01N 33/5017; G01N 33/505; G01N 33/56988; G01N 33/57423; G01N 33/57434; G01N 33/57438; G01N 33/57446; G01N 33/6848; G01N 33/686; G01N 35/1097
USPC .................................................. 73/290 R–334
See application file for complete search history.

(56) References Cited

U.S. PATENT DOCUMENTS

| | | | | |
|---|---|---|---|---|
| 5,384,023 | A * | 1/1995 | Stalling | B01D 11/0419 |
| | | | | 204/556 |
| 8,557,599 | B2 * | 10/2013 | Koyata | G01N 35/00603 |
| | | | | 436/164 |
| 2001/0031500 | A1 | 10/2001 | Kawamura | |
| 2006/0110292 | A1 * | 5/2006 | Deverse | G01F 23/686 |
| | | | | 422/68.1 |
| 2010/0273273 | A1 * | 10/2010 | Cross | G01F 23/24 |
| | | | | 436/174 |
| 2013/0078733 | A1 * | 3/2013 | Holmes | G01N 35/1072 |
| | | | | 436/174 |
| 2014/0234949 | A1 * | 8/2014 | Wasson | G01N 35/00871 |
| | | | | 435/287.2 |
| 2017/0285054 | A1 * | 10/2017 | Muz | G01N 35/00623 |
| 2019/0301918 | A1 * | 10/2019 | Huang | G01N 35/1016 |
| 2020/0326356 | A1 * | 10/2020 | Wasson | C12Q 1/42 |

* cited by examiner a b

METHOD TO CHECK THE CONSUMMATION OF SAMPLING BY CONCAVE LIQUID LEVEL

TECHNICAL FIELD

The present invention relates to a method for judging whether or not a detection sample has been supplied.

BACKGROUND ART

In a detection system, it is necessary to judge whether or not a detection sample has been supplied for the purpose of preventing occurrence of detection errors and/or a waste of resources due to false detection or the like. Further, in a detection system, such as a real-time environment monitoring system, configured to perform real-time online detection of a detection sample, in order to quickly judge whether or not a malfunction occurred in the sampling system, it is necessary to judge whether or not an online sample has been sampled.

The above-described detection system is provided with, as major components, a reaction cell, a sample supply unit, reagent supply units, and a spectrometer (light source, photoelectric sensor). In the reaction cell, a sample reacts with a reagent and the reacted sample is detected. Thus, a detection result of ions, etc., in the sample is obtained.

Conventionally, there are the following two judging methods for judging whether or not a detection sample has been supplied in the above-described detection system. The first method is configured to judge whether or not a detection sample has been supplied by utilizing a fluid level sensor. The second method is configured to judge whether or not a detection sample has been supplied after mixing a reagent and a sample and before or after the reaction by utilizing an existing spectrometer in a detection system. In other words, the second method is configured to judge whether or not a detection sample has been supplied by comparing the light intensity of the detection light transmitted through air and the light intensity of the detection light transmitted through the liquid of the detection sample in a state in which the liquid level of the detection sample is set to a position above the position where the spectrometer is installed. Specifically, initially, it is judged whether or not it is necessary to dilute the detection sample. Next, depending on the necessity of dilution, the judgment is performed by different methods.

In cases where the detection sample is not required to be diluted, that is, the concentration of the detection sample is low; the supply amount of the detection sample is large. When the detection sample has not been supplied, the liquid level is lower than the position of the spectrometer even if a reagent is added later. Therefore, the detected light intensity is almost the same as the light intensity when there is air in the reaction cell. Therefore, even if an instruction to supply a detection sample is issued to the detection system, the light intensity detected by the spectrometer may not change. With this, it is judged that a detection sample has not been supplied. On the other hand, when a detection sample has been supplied, after mixing the detection sample and a reagent, the liquid level exceeds the position of the spectrometer (that is, the optical path of the detection light), and a spectrometer (that is, a photoelectric sensor) can detect that the light intensity has changed. With this, it is judged that a detection sample has been supplied.

In cases where it is required to dilute a detection sample, that is, the concentration of the detection sample is high; the supply amount of the detection sample is small. At that time, since it is necessary to add a dilute solution, even if the liquid level exceeds the position of the spectrometer by adding a reagent, it is not possible to judge whether or not the detection sample has been supplied. Therefore, after the reaction, it is judged whether or not the detection sample has been supplied only by the color light intensity or the like.

SUMMARY

Among the above-described currently existing two methods, in the first method, a fluid level sensor is required, and it is also required to redesign the hardware and the software so as to be suitable for the detection system. In the second method, the judgment is performed by different methods depending on the necessity of dilution, and therefore, the firmware's logic is complicated. Also, since it is necessary to use reagents cooperatively, it wastes reagents, and in the absence of the reagent, there is a possibility that a misjudgment may be done. Further, in cases where it is necessary to dilute a detection sample, the judgment can be done only after the reaction. For this reason, in cases where no detection sample has been supplied, reagents will be wasted. Furthermore, in cases where the light intensity of the detection light transmitted through air and the light intensity of the detection light transmitted through the liquid of the detection sample are the same under the specific turbidity or chromaticity of the detection sample, when the second method is adopted, there is a possibility that a misjudgment may be done. In the second method, since the light intensity of the detection light transmitted through the liquid of the detection sample becomes stable in value after a certain time has elapsed, it takes time until the judgment becomes available.

The present invention has been made in view of the aforementioned problems, and aims to provide a method capable of easily, assuredly and quickly judging whether or not a detection sample has been supplied by an existing device in a detection system.

Means for Solving the Problems

The method for judging whether or not a detection sample has been supplied according to embodiments of the present invention is directed to a method for judging whether or not a detection sample has been supplied in a detection system. The detection system includes a reaction cell including a container in which the detection sample is reacted, a light source configured to emit a detection light toward an inside of the reaction cell from one side of the reaction cell, and a photoelectric sensor arranged on the other side of the reaction cell so as to face the light source and configured to receive the detection light transmitted through the reaction cell and convert received detection light into an electrical signal. The method comprises judging whether or not the detection sample has been supplied based on a variation in the electrical signal output from the photoelectric sensor when an instruction to supply the detection sample to the reaction cell is transmitted to the detection system in a state in which the light source and the photoelectric sensor are being operated. In the step of judging, when the liquid level of the detection sample reaches an optical path of the detection light, causing an amount of change of the electrical signal output from the photoelectric sensor to exceed a specified threshold, it is judged that the detection sample has been supplied.

According to embodiments of the present invention, the detection system is provided with an existing light source and an existing photoelectric sensor as a detector, and is configured to send an instruction to supply a detection sample to a reaction cell in the detection system in a state in which the light source and the photoelectric sensor are being operated. When a detection sample has been supplied, the liquid surface in the reaction cell becomes in a concave or convex shape due to the tensile force of the liquid. As a result, when the liquid level of the detection sample liquid reaches the optical path of the detection light, the detection light is scattered and/or refracted at its liquid level. For this reason, the light intensity of the detection light received by the photoelectric sensor is greatly reduced. Depending on the change of the light intensity at that time, it is judged that a detection sample has been supplied. For the reason described above, with existing devices in a detection system, it is possible to easily, assuredly and quickly judge whether or not a detection sample has been supplied.

EMBODIMENTS FOR CARRYING OUT THE INVENTION

Hereinafter, embodiments of the present invention will be described with reference to the drawings.

Figure 1:
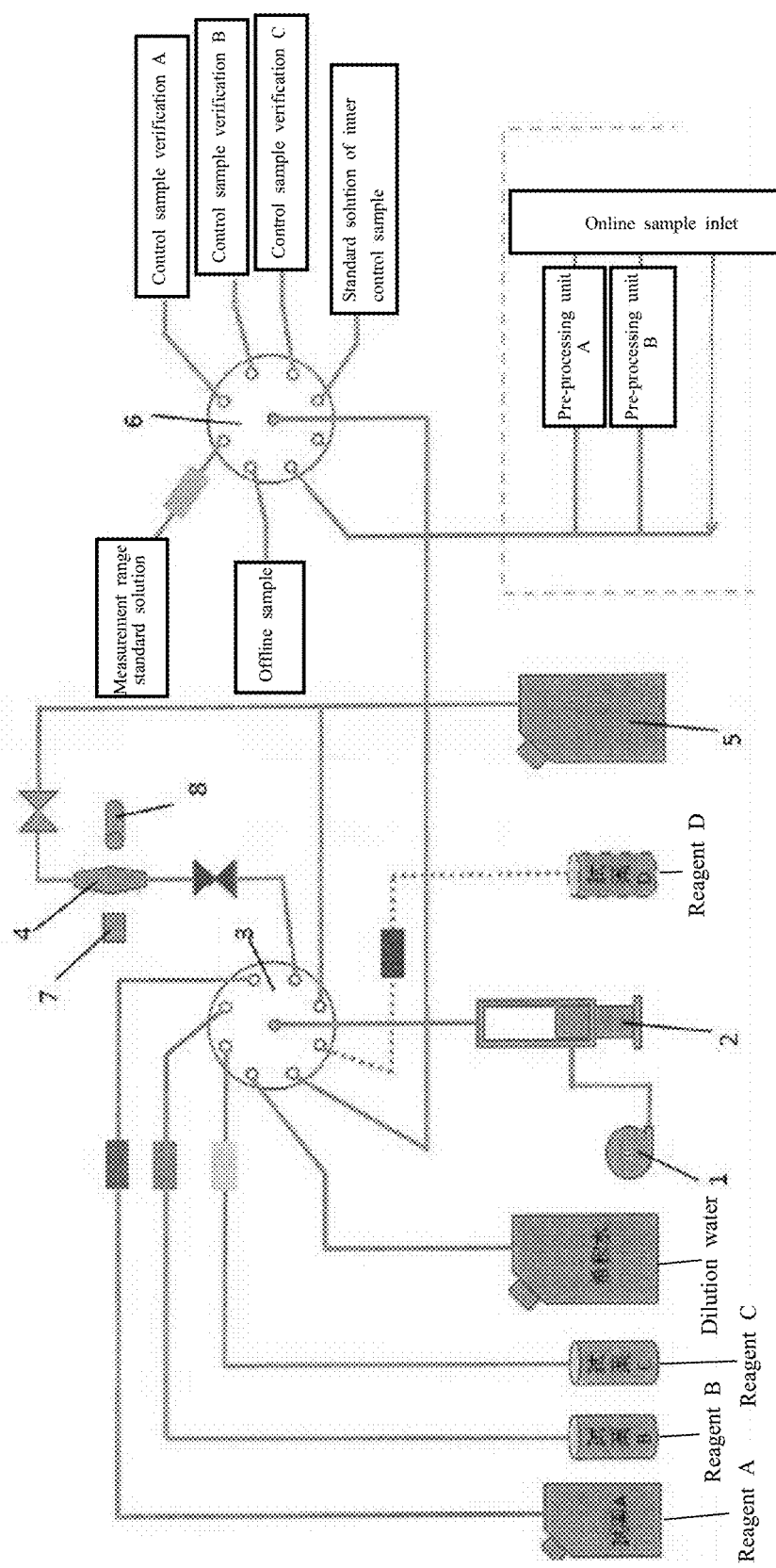
FIG. 1 is a diagram for explaining an example of a detection system to which the judging method of embodiments of the present invention may be applied.

As shown in FIG. 1, the detection system according to embodiments of the present invention is provided with an air mixing pump 1, a syringe 2, multi-port valves 3 and 6, a reaction cell 4, a waste bucket 5, a photoelectric sensor 7, a light source 8, and containers storing reagents A to D and dilution water. The photoelectric sensor 7 and the light source 8 are devices provided in an existing spectrometer in a detection system. The photoelectric sensor 7 is configured to receive the detection light transmitted through the reaction cell 4 from the light source 8. Specifically, the light source 8 is configured to emit detection light toward the inside of the reaction cell 4 from one side of the reaction cell 4. The photoelectric sensor 7 is arranged on the other side of the reaction cell 4 so as to face the light source 8, and is configured to receive the detection light transmitted through the reaction cell 4 and convert the signal of the received detection light into an electrical signal. Further, as shown in FIG. 1, by switching the multi-port valve 6, the detection system according to embodiments of the present invention can detect not only an offline sample but also an online sample in real-time sampling. It should be noted that the following description will be directed to the case of detecting an online sample, but the method of the present invention can also be applied to the case of detecting an offline sample. It should further be noted that the method of the present invention is not limited to a method of detecting offline samples or online samples, and the method of the present invention can also be applied to a correction of a detection system or a detection of a control sample to judge whether or not the sample supply is being normally performed.

In the case of detecting an online sample, real-time sampling is performed on an online sample to be monitored in real time by a sampling system (not illustrated). After that, the online sample is introduced into the detection system via the online sample inlet. Before introducing the online sample to the reaction cell 4 by the air mixing pump 1 and the syringe 2, the online sample is subjected to preprocessing by the preprocessing unit A or the preprocessing unit B. It should be noted that the online sample may be directly introduced into the reaction cell 4 without being subjected to preprocessing.

After that, the passage pipes, the syringe 2, the multi-port valves 3 and 6, and the reaction cell 4 are washed using an online sample. After washing, the online sample is discharged to the waste bucket 5. Thereafter, a specified amount of the online sample and the reagent are introduced into the reaction cell 4 to react with the online sample and the reagent. After completion of the reaction, the liquid after the reaction is detected to obtain the detection result of ions, etc., in the sample. After completion of the detection, the liquid after the reaction is discharged to the waste bucket 5 by the air mixing pump 1 and the syringe 2.

For such detection systems, it is necessary to judge whether or not an online sample has been supplied.

According to embodiments of the present invention, it is judged whether or not an online sample has been supplied by utilizing the photoelectric sensor 7 and the light source 8 in the existing spectrometer of a detection system. Specifically, in the process of judging, in a state in which the photoelectric sensor 7 and the light source 8 are being operated, an instruction to supply a detection sample to the reaction cell 4 is sent to the detection system.

Figure 2:
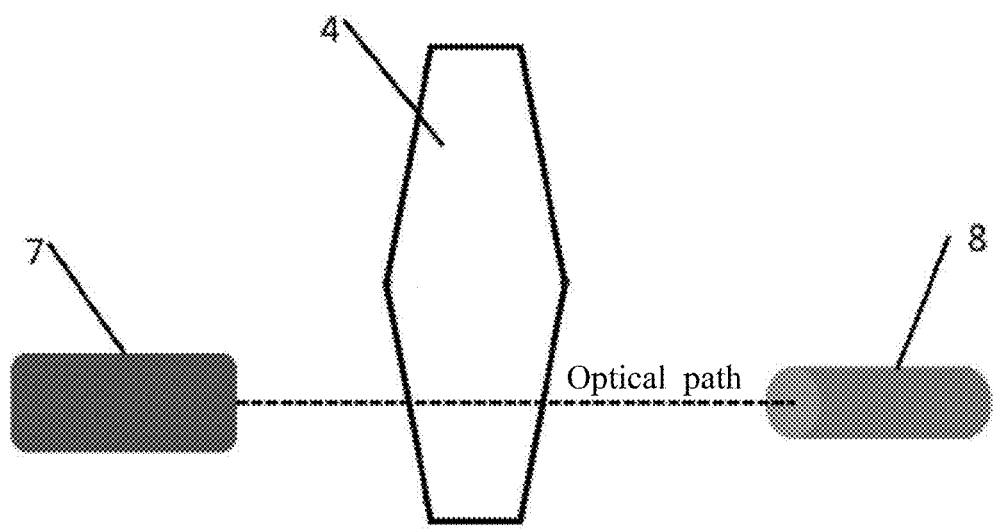
FIG. 2 is a schematic view showing the propagation direction of the detection light before and after the liquid level of the detection sample reaches the optical path of the detection light.
Figure 2:
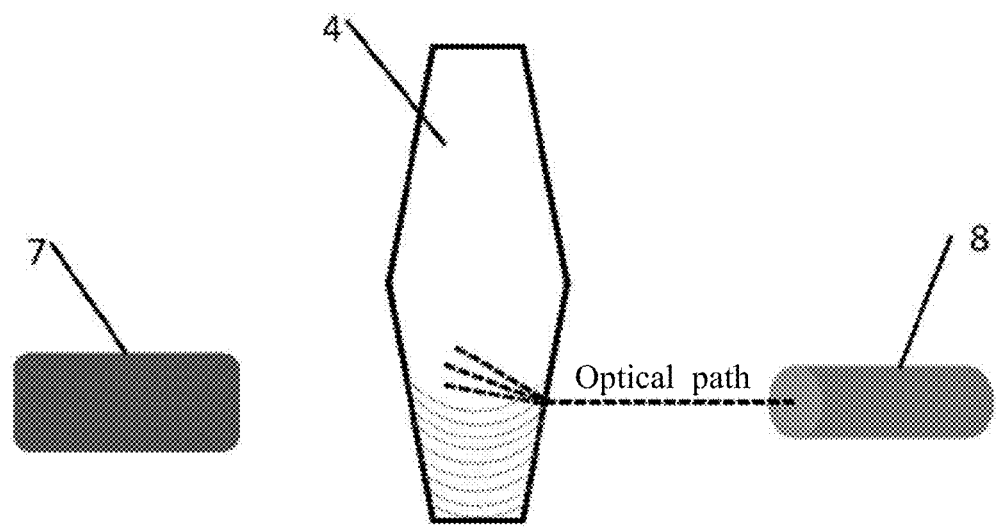

As shown in "a" of FIG. 2, in cases where an online sample has not being supplied, or in cases where an online sample has been supplied but the liquid level of the online sample has not reached the optical path of the detection light, the light intensity received by the photoelectric sensor 7 corresponds to the light intensity of the detection light transmitted through air in the reaction cell 4. As shown in "b" of FIG. 2, in cases where a detection sample has been supplied, the liquid surface in the reaction cell becomes in a concave shape due to the tension of the liquid. When the liquid level of the online sample reaches the optical path of the detection light, the detection light will be scattered and/or refracted at the liquid level at which the liquid surface becomes in a concave shape. Therefore, the light intensity of the detection light received by the photoelectric sensor 7 is greatly reduced. On the other hand, the electrical signal output from the photoelectric sensor 7 changes significantly. With this, it is possible to judge such that a detection sample has been supplied. Here, even if only the highest point of the liquid level reaches the optical path of the detection light, the detection light will be scattered and/or refracted at the highest point of the liquid level. For this reason, the light intensity of the detection light received by the photoelectric sensor 7 is also greatly reduced.

It may be configured such that a threshold may be set with respect to the amount of change of the electrical signal output from the photoelectric sensor 7. In this case, it is judged that an online sample has been supplied only when the amount of change exceeds the threshold. Further, in cases where the electrical signal output from the photoelectric sensor 7 does not change or the amount of change does not exceed the threshold after a specified time has elapsed, it is judged that an online sample has not been supplied. As a result, it is possible to prevent occurrence of a misjudgment due to changes in the humidity of air or the like.

As described above, the method includes judging whether or not the detection sample has been supplied based on a variation in the electrical signal output from the photoelectric sensor changes when an instruction to supply the detection sample to the reaction cell is transmitted to the detection system in a state in which the light source and the photoelectric sensor are being operated. When the highest point of the liquid level of the detection sample reaches an optical path of the detection light to cause the amount of change of the electrical signal output from the photoelectric sensor to exceed the specified threshold, it is judged that the detection sample has been supplied.

Further, the judging method of embodiments of the present invention further may include a washing step of washing passage pipes and the reaction cell 4 in the detection system using the online sample before detecting the online sample. It may be judged that an online sample has been supplied based on whether or not the electrical signal output from the photoelectric sensor 7 changes when the reaction cell 4 is washed. As such, it is possible to judge whether or not an online sample has been supplied at the time of washing.

As mentioned above, the judging method of embodiments of the present invention does not require hard parts, such as, e.g., fluid level sensors, and is not affected by the turbidity and/or chromaticity of the detection sample. Therefore, with existing devices of a detection system, it is possible to assuredly judge whether or not a detection sample has been supplied. Further, in the judging method of embodiments of the present invention, when the highest point of the liquid level reaches the optical path of the detection light, the supplying of the detection sample may be stopped. With this, the supply amount of the detection sample required for judgment can be reduced. In the judging method of embodiments of the present invention, when the highest point of the liquid level of the detection sample reaches the optical path of the detection light, the light intensity of the detection light received by the photoelectric sensor 7 is rapidly reduced. With this, the time required for the judgment can be shortened, and it is possible to quickly judge whether or not a detection sample has been supplied.

When it is judged that an online sample has not been supplied, it is possible to judge that a malfunction occurred in the sampling system for real-time sampling. As a result, surveys and/or repairs can be made as soon as possible.

Note that the above-description is directed to the case in which the liquid surface of the online sample is formed in a concave shape. However, depending on the type of the online sample, there is a possibility that the liquid surface of the online sample becomes in a convex shape. Even in cases where the liquid surface of the online sample becomes in a convex shape, the judging method of embodiments of the present invention can be applied.

Although embodiments of the present invention were described above, the embodiments were described only for the illustrative purpose and not intended to limit the scope of the invention. These embodiments can be implemented in various other forms, and various omissions, replacements, changes and combinations can be made without departing from the spirit of the invention. These embodiments and modifications thereof are included within the scope and the spirit of the invention, and are also included in the invention described in the claims and the equivalent scope thereof.

DESCRIPTION OF REFERENCE SYMBOLS

1: air mixing pump
2: syringe
3: multi-port valve
4: reaction cell
5: waste bucket
6: multi-port valve
7: photoelectric sensor
8: light source

The invention claimed is:

1. A method for judging whether or not a detection sample has been supplied in a detection system,
the detection system including:
a reaction cell including a container in which the detection sample is reacted,
a light source configured to emit a detection light toward an inside of the reaction cell from one side of the reaction cell, and
a photoelectric sensor arranged on the other side of the reaction cell to face the light source and configured to receive the detection light transmitted through the reaction cell and convert the received detection light into an electrical signal,
the method comprising a step of judging whether or not the detection sample has been supplied, based on a variation in the electrical signal output from the photoelectric sensor when an instruction to supply the detection sample to the reaction cell is transmitted to the detection system in a state in which the light source and the photoelectric sensor are being operated, and
wherein the step of judging includes judging that the detection sample has been supplied when the liquid level of the detection sample reaches an optical path of the detection light, causing an amount of change of the electrical signal output from the photoelectric sensor to exceed a specified threshold.

2. The method as recited in claim 1,
wherein the detection system is configured to judge that the detection sample has not been supplied in cases where the electrical signal output from the photoelectric sensor shows no change or the amount of change of the electrical signal does not exceed the specified threshold after a specified time has elapsed.

3. The method as recited in claim 1,
wherein the step of judging includes judging that the detection sample has been supplied in response to the highest point of the liquid level of the detection sample reaching an optical path of the detection light to cause the amount of change of the electrical signal output from the photoelectric sensor to exceed the specified threshold.

4. The method as recited in claim 1,
wherein the method further includes a washing step of washing passage pipes and the reaction cell in the detection system using the detection sample before detecting the detection sample, and
wherein the step of judging is performed when the washing step is performed.

5. The method as recited in claim 1,
wherein when the detection system performs online real-time detection, the detection sample is an online sample sampled in real-time via a sampling system, and
wherein the step of judging further includes, in response to judging that the online sample has not been supplied, judging that a malfunction has occurred in the sampling.

\* \* \* \* \*